United States Patent [19]

Ishii

[11] Patent Number: 5,284,355
[45] Date of Patent: Feb. 8, 1994

[54] TREADLE-TYPE VEHICLE HAVING A FOLDABLE FRONT WHEEL SHAFT

[76] Inventor: Shizuo Ishii, 1-9-11, Ushidahon-cho, Higashi-ku, Hiroshima City, Hiroshima, Japan

[21] Appl. No.: 6,947

[22] Filed: Jan. 21, 1993

[30] Foreign Application Priority Data

Jul. 30, 1992 [JP] Japan .................. 4-059540

[51] Int. Cl.$^5$ .............................................. B62K 15/00
[52] U.S. Cl. ......................... 280/287; 280/288.1; 280/265; 280/282
[58] Field of Search ............. 280/287, 282, 288.1, 280/288.4, 295, 265, 278

[56] References Cited

U.S. PATENT DOCUMENTS

| | | | |
|---|---|---|---|
| 4,203,612 | 5/1980 | Feikema | 280/287 |
| 4,431,205 | 2/1984 | Speicher et al. | 280/288.1 X |
| 4,925,200 | 5/1990 | Jones | 280/288.1 X |
| 5,145,196 | 9/1992 | Langkamp | 280/287 X |

FOREIGN PATENT DOCUMENTS 0249782  10/1990  Japan .................. 280/287

Primary Examiner—Margaret A. Focarino
Assistant Examiner—Carla Mattix
Attorney, Agent, or Firm—Kanesaka and Takeuchi

[57] ABSTRACT

A human-powered vehicle includes a folding front axle with front wheels, at least one rear wheel, and rear castors. The vehicle may stand upright on the castors and the rear wheel in order to reduce the parking area. The vehicle driver reciprocates a manual lever to drive the rear wheel through a roller chain which runs from the lever to a tensioning means through a free-wheel hub on a rear wheel shaft. The driver's feet are used to steer by pushing against the front axle assembly. The front axle assembly has two half-axles and a central member to which they are hinged. The assembly is locked into a rigid configuration for running the vehicle, and when unlocked, the half-axles and the central member fold up into the shape of an "N" to reduce the axle length. The combination of standing upright and folded axle make the parked "footprint" very small.

12 Claims, 2 Drawing Sheets

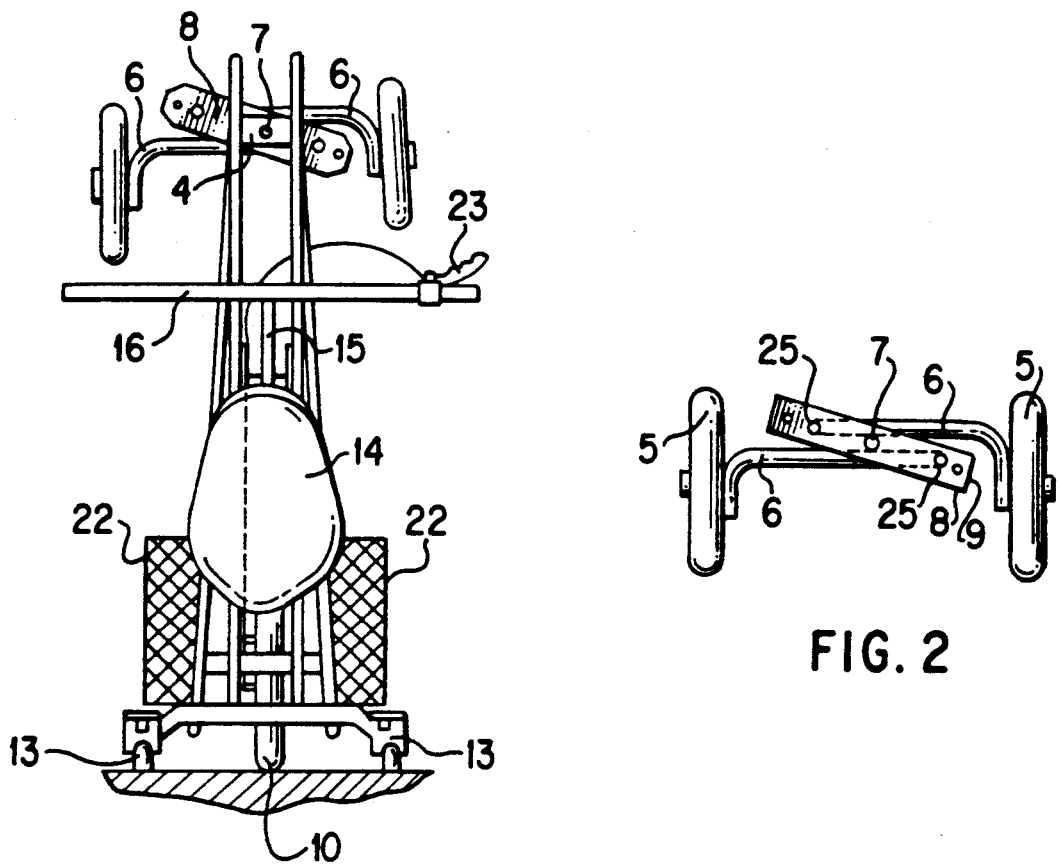
FIG. 1
FIG. 2
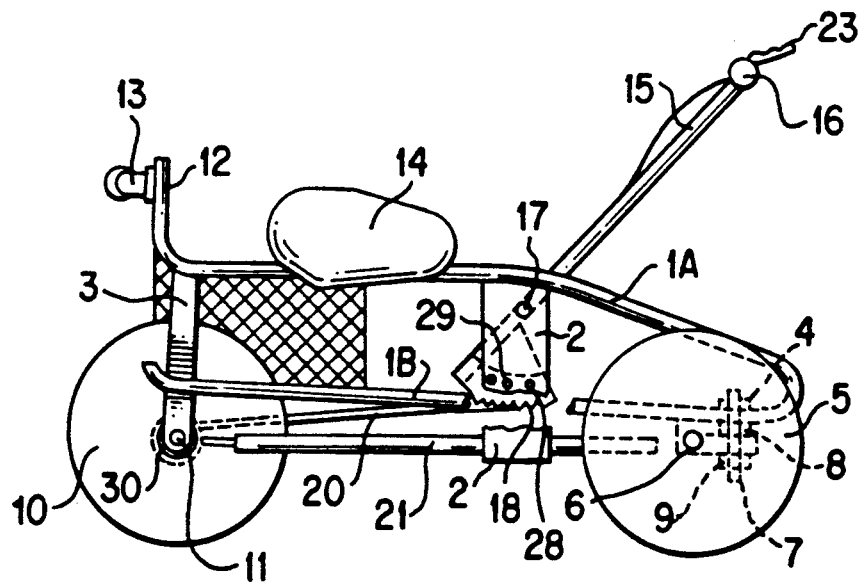
FIG. 3

TREADLE-TYPE VEHICLE HAVING A FOLDABLE FRONT WHEEL SHAFT

BACKGROUND OF THE INVENTION

1. Field of the Invention

The present invention relates to a vehicle having a foldable front wheel shaft and, more particularly, to a vehicle having a foldable front wheel shaft which is human-powered and can also be used as a shopping cart.

2. Description of the Prior Art

Three-wheeled bicycles, four-wheeled carts with treadle drives, and similar human-powered vehicles are used in many cities and resort areas for both transportation and exercise. These three- and four-wheeled vehicles are suitable for carrying a light load as well as carrying the driver. They are stable even when stopped or driven slowly, so that people who can not drive a regular two-wheeled bicycle can use them.

However, such conventional human-powered vehicles are relatively large, typically covering a ground area of from 1.0 to 2.5 square meters, as measured by the vertical projection of the vehicle onto the ground. If many such vehicles need to be parked at a resort, school, hospital, or other places, a large parking lot must be provided for them.

Ordinary two-wheeled bicycles also occupy a large space, i.e. 1.0 to 2.0 square meters or more, when parked. Providing parking for conventional bicycles can also be a problem where large numbers of bicyclists gather.

SUMMARY OF THE INVENTION

The present invention is focused on the need to reduce the parking area required by human-powered vehicles.

Therefore, an object of the present invention is to provide a vehicle which is adapted for easy operation and exercise of the whole body and which can simultaneously reduce its projected ground area as small as possible for parking while retaining a wide wheelbase for stability when the vehicle is moving slowly or is stopped.

Another object of the invention is to provide a human-powered vehicle which can be used as a shopping cart.

Accordingly, the vehicle of the present invention contemplates a preferred embodiment which includes the following elements: a frame; a folding front wheel axle assembly for supporting a pair of steerable front wheels; a manual lever pivotally supported at a central location on the vehicle frame for forward-and-backward reciprocation by the vehicle driver's hands to power the vehicle; a seat mounted on an upper rear portion of the frame for the driver to occupy while reciprocating the manual lever with the hands and steering with the feet; a partial sprocket disposed at a lower end of the manual lever to be moved axially forward and backward by reciprocation of the manual lever; a roller chain connected at one end to the partial sprocket and extending to the rear of the vehicle; and a chain sprocket coaxially mounted to one or more rear wheels through a free-wheel hub, e.g. a one-way ratchet mechanism so that the rear wheel or wheels may be driven forwardly by the roller chain; and a coil spring coupled to the other end of the roller chain, to take up slack in the chain. By this mechanism the vehicle is driven forward when the lever is reciprocated by the driver.

The folding front wheel axle assembly further includes a pair of front wheel half-axles foldably pinned between elongated upper and lower joint plates, which are in turn pivotally hinged to the frame for steering movement of the whole axle. The axle assembly folds around first securing means, i.e. a vertical steering shaft passing through the center of each joint plate, and second securing means, i.e. bolts or the like, which hinge the plates to the half-axles. The axle assembly folds into an "N" shape, and unfolds for running the vehicle. In the folded position, the shafts and the wheels at the outer ends, are folded in close to the frame. In the unfolded running position, the half-axles and the joint plates are held in a straight configuration by lock pins or the like.

The invention further contemplates a vehicle as described above, further comprising a vertically-extending member on which is mounted a pair of castors. The castors are even with the rear-most part of the rear wheel, so that the vehicle may be tilted upward to stably rest upon the rear wheel and the castors, thus greatly reducing the ground area needed for parking and storage.

The invention still further contemplates a vehicle as described, further including one or more luggage baskets or panniers disposed on either side of the rear wheel.

These and other objects, features and advantages of the present invention will be more apparent from the following description of the preferred embodiment, taken in conjunction with the accompanying drawings.

BRIEF DESCRIPTION OF THE DRAWINGS

FIG. 1 is a front elevation view of the present invention in its upright parked position, wherein front wheel shafts are folded;

FIG. 2 is a detailed view of the folded front wheel axle assembly, wherein a frame is removed from the vehicle;

FIG. 3 is a partially cut side elevation view of the invention in its running position, wherein the three running wheels are on the ground;

DETAILED DESCRIPTION OF THE PREFERRED EMBODIMENT

Figure 5:
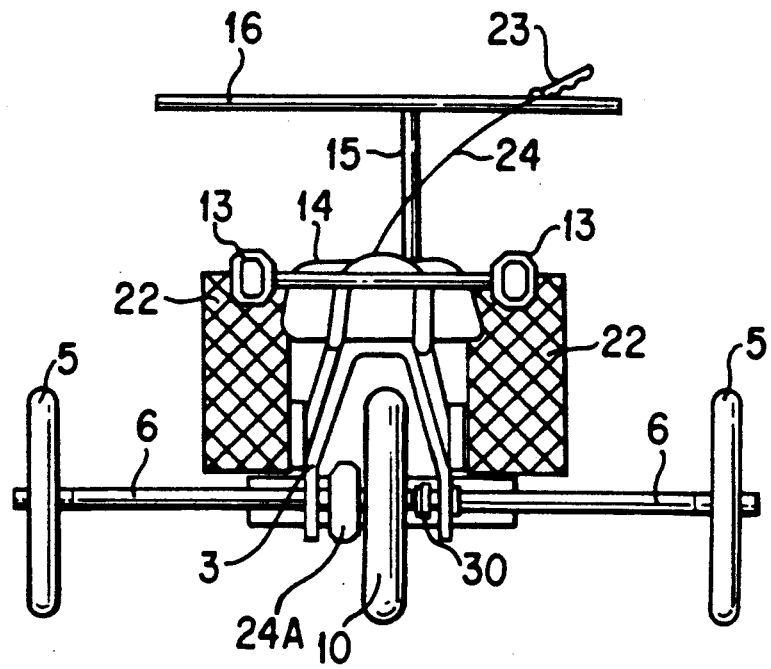
FIG. 5 is a rear elevation view of the invention in running position.

Hereinafter, an embodiment of the present invention will be described with reference to the drawings.

As shown in the drawings, a preferred embodiment of the present invention includes a frame constructed with left and right frame tubes 1 which are bent around at the front ends to form upper and lower rails 1A and 1B, respectively. The distance between the lower rails 1B is greater than the distance between the upper rails 1A.

A central frame plate 2 has a modified U-shape, i.e. the distance between the upper portions is greater than the distance between the lower portion. Each side portion of the central frame plate 2 extends vertically obliquely from the upper rail 1A to the lower rail 1B, and is connected together at lower portions thereof. A rear frame plate 3 having an inverted U-shape joins the upper and lower rails 1A, 1B at the rear. A front cross member 4 joins the tubes 1 at the front. If required, the front cross member 4 may be further secured to or supported by other members.

The vehicle also includes a manual lever 15, a partial sprocket 18 fixed to the lever 15, a roller chain 20, a coil spring (not shown) disposed within a tubular member 21, and a sprocket hub 30 for driving the rear wheel when the lever 15 is reciprocated by the driver pushing and pulling on a lever handle 16 connected to the lever 15, as is described more fully below. To stop the vehicle, a brake lever 23, a brake wire 24, and a rear band brake 24A are provided.

The folding front wheel assembly includes front wheels 5, half-axles 6 hinged to upper and lower joint plates 8 and 9, and a vertically-oriented steering shaft 7 passing through the frame cross member 4 and the midpoints of the plates 8 and 9. The plates 8 and 9 rotate relative to the frame about the shaft 7. Both front wheel half-axles 6 are interposed between the joint plates 8 and 9, and are pivotally joined by bolts 25.

Removable lock pins 26 allow the axles 6 to be fixed to the plates 8 and 9 to form a single rigid front wheel support member or axle. The half-axles 6 are firmly fixed to the joint plates 8, 9 by the combination of the bolts 25 and the pins 26. Thus, even when the vehicle hits an obstacle when running, the assembly is not folded. The driver steers the vehicle by pushing against these axles 6 with the feet to rotate relative to the shaft 7.

Figure 4:
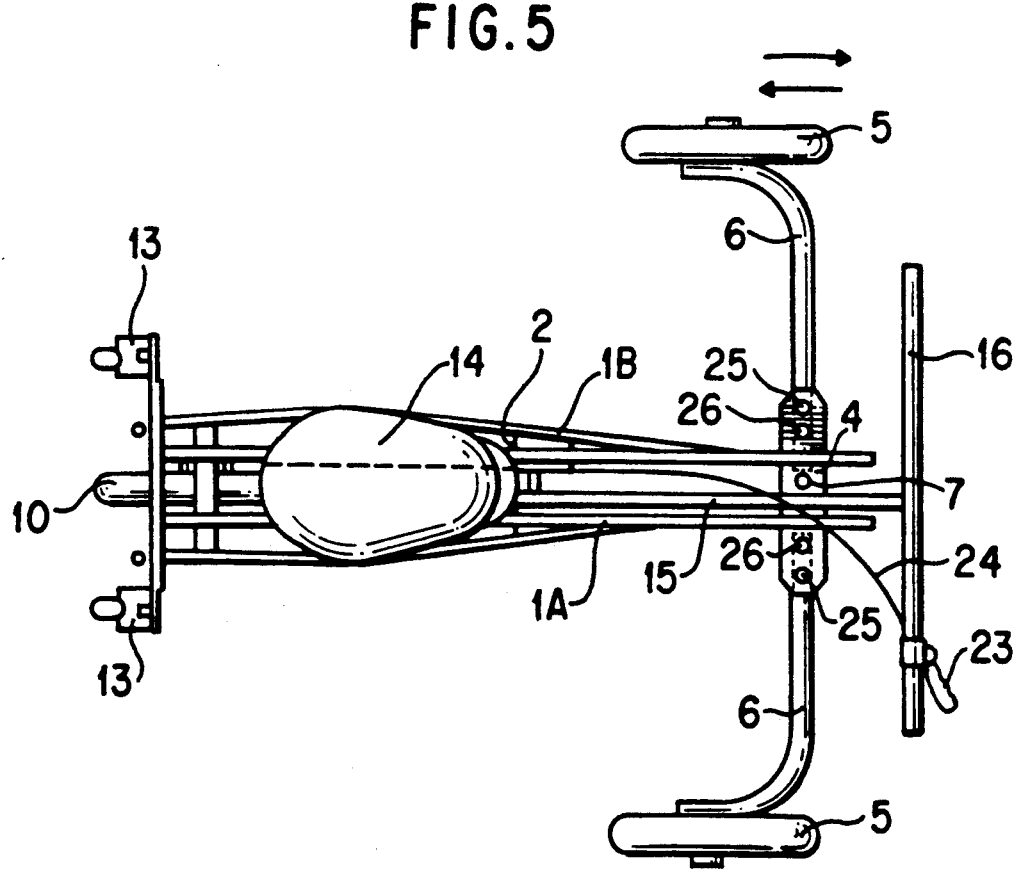
FIG. 4 is a top plan view of the invention in running position.

When required for storage, the half-axles 6 can be folded into an N-like shape, as shown in FIGS. 1 and 2, by removing the lock pins 26 though the joint plates 8, 9. The lock pins may include snap locks or other means for quickly removing them. Thus, the front axle assembly can be shortened to about half the width it occupies when the half-axles 6 are deployed in the extended position for running as shown in FIGS. 4 and 5.

The vehicle can also be placed into a standing position as shown in FIG. 1. In this upright position, the vehicle rests on a tripod formed by the rear wheel 10 and two castors 13. In such a position, the area of its vertical projection on the ground is about 0.2 to 0.4 square meters. The parking efficiency is thereby enhanced.

In the standing position, the lever handle 16 can be fixed at a desired location by inserting a pin through hole 29 of the central frame plate 2 and into one of the holes 28 in the partial sprocket 18 (FIG. 3). Thus, the vehicle can be used also as a hand-push type or hand-pull type cart. The height of the handle 16 is adjustable by picking the desired hole 28 to accept the lock pin.

There is no problem when the vehicle is used as a hand-push type cart. However, when it is pulled in the direction of the castors 13 as a hand-pull type cart, the rear wheel 10 is braked by the free wheel hub 30 because the hub works as a one-way sprocket of the rear wheel shaft 11 for driving. This braking effect can, however, be utilized when the vehicle is parked on a slope.

If it is necessary to use the vehicle as a hand-pull type cart, the roller chain 20, which is always in tension due to its attachment to the coil spring situated inside the tubular member 21, can be taken off the hub 30 by a hook-shape jig (not shown) to remove the braking effect. The hook-shape jig prevents oil from soiling the hands.

When the half-axles 6 are in the extended position and the driver is seated on seat 14, with his or her feet against the respective half-axles 6 for foot steering, the lever handle 16 is worked to and fro manually to drive the vehicle. The lever handle 16 is welded to a lever 15 to form a T-shape. The lever 15 turns on a pivot 17 located on the upper portion of the frame plate 2 for reciprocation by the driver. The partial sprocket 18 having a fan-like shape is welded to a lower front portion of lever 15 below the pivot 17.

The front end of the partial sprocket 18 is attached to one end of the roller chain 20. The chain 20 wraps partially around sprocket 18 and extends rearwardly therefrom to wind around the complete sprocket of freewheel hub 30, which is mounted on a rear wheel shaft 11. The shaft 11 is disposed between lower portions of the rear frame plate 3. Hub 30 includes a freewheel mechanism, i.e. locking in one direction only and free-wheeling in the other direction, which drives the rear wheel 3 when the roller chain moves forward and free-wheels when the chain moves backward.

To keep the roller chain 20 in tension at all times, the end of the chain 20 away from the partial sprocket 18 is attached to the coil spring inside the tubular member 20. The member 20 is made of, for example, polyvinyl chloride. Intermittent operation of the rear wheel can be achieved by moving the lever 15 back and forth.

Although only one rear wheel is shown on the illustrated embodiment, a pair of rear wheels spaced a small distance apart on a common axis could also be used.

As shown in FIG. 3, a stay 12 having an L-like shape is provided at the rear end of either upper rail 1A. The rails 1A have bent end portions extending perpendicular to a first plane defined by the front and rear wheels. The stay 12 is attached to these end portions. A pair of castors 13, 13 is attached at the ends of the stay 12 so as to define together with the rear wheel 10 a second plane, substantially perpendicular to the first plane. The second plane defined by these members allows the vehicle body to stand stably as shown in FIG. 1.

Baskets 22 are detachably set on one or both sides of the vehicle frame. Incidentally, each basket is provided with a cover to prevent dropping of the luggage therefrom when the vehicle is stood upright.

According to the present invention, it becomes possible to provide a human-powered vehicle which has a very small parking area, but still is stable at a low speed when in the running position. The present invention is also easy to operate in either the running position or in the upright position as a cart. The invention has the further advantage of exercising the whole body, instead of just the legs. The present invention can be driven to a store and used there as a shopping cart. It can be taken onto trains and buses where bicycles and the like are not permitted.

Various modifications will become possible for those skilled in the art after receiving the teachings of the present disclosure without departing from the scope thereof.

What is claimed is:
1. A human-powered vehicle comprising:
a frame;
front wheel means coupled to said frame and including a pair of front wheels and a folding axle assembly for mounting the front wheels, said front wheels having an extended position for running said vehicle and a retracted position for parking, said folding axle assembly including:
a central member pivotally coupled to said frame by first securing means located at a midpoint of said central member, said central member having a left end and a right end;

a left half-axle pivotally coupled to the left end of said central member by left-hand second securing means, and having left bearing means for mounting one of said pair of front wheels;

left-hand locking means for locking said left half-axle in an extended position relative to said central member;

a right half-axle pivotally coupled to the right end of said central member by right-hand second securing means, and having right bearing means for mounting one of said pair of front wheels; and right-hand locking means for locking said right half-axle in an extended position relative to said central member so that said folding axle assembly is locked into the extended position by said left-hand locking means and said right-hand locking means, or folded into an N shape when unlocked and so retracted inward for parking, said pair of wheels being angularly fixed to said axle assembly in the extended position;

a seat coupled to said frame, said seat being disposed such that a vehicle driver may steer said vehicle by pressing upon said axle assembly with feet to rotate said axle assembly about said first securing means;

at least one rear wheel coupled to said frame;

drive means coupled to said rear wheel; and support means mounted to said frame, said support means and said rear wheel defining a polygon lying in a plane generally perpendicular to a plane joining said front wheel means and said at least one rear wheel so that said vehicle may be stood upright on said rear wheel and said support means to reduce a parking area of said vehicle.

2. The vehicle according to claim 1, wherein said support means includes castors.

3. The vehicle according to claim 1, wherein said left-hand locking means and said right-hand locking means include removable pins insertable through holes in said central member and aligned through holes in said central member, in said left half-axle, and in said right half-axle.

4. The vehicle according to claim 1, wherein said drive means further includes:

a manual lever pivotally coupled to said frame for reciprocation; and linkage means joining said lever and said rear wheel for rotating said rear wheel upon reciprocation of said lever.

5. The vehicle according to claim 4, wherein said linkage means further includes:

a flexible linear drive element having a first end attached to said lever;

tensioning means attached to a second end of said drive element to maintain tension in said drive element; and a free-wheel hub coupled to said rear wheel, said drive element wound about and engaging said hub to turn said hub to propel said vehicle.

6. The vehicle according to claim 1, further including a stay attached to a rear portion of said frame behind said seat, and said support means includes a pair of castors mounted on said stay.

7. The vehicle according to claim 1, further comprising a luggage container mounted on said frame and having a closable lid to prevent loss of luggage when said vehicle is stood upright.

8. The vehicle according to claim 7, wherein a pair of said containers is mounted on either side of said rear wheel.

9. A human-powered vehicle comprising:

a frame;

a seat coupled to said frame;

front wheel means coupled to said frame and including a pair of front wheels and a folding axle assembly for mounting the front wheels, said front wheels having an extended position for running said vehicle and a retracted position for parking, said folding axle assembly including:

a central member pivotally coupled to said frame by first securing means located at a midpoint of said central member, said central member having a left end, a right end, an upper plate and a lower plate;

a left half-axle disposed between the upper and lower plates of the central member and pivotally coupled to the left end of said central member by left-hand second securing means, said left half-axle having left bearing means for mounting one of said pair of front wheels;

left-hand locking means for locking said left half-axle in an extended position relative to said central member;

a right half-axle disposed between the upper and lower plates of the central member and pivotally coupled to the right end of said central member by right-hand second securing means, said right half-axle having right bearing means for mounting one of said pair of front wheels; and right-hand locking means for locking said right half-axle in an extended position relative to said central member so that said folding axle assembly is locked into the extended position by said left-hand locking means and said right-hand locking means, or folded into an N shape when unlocked and so retracted inward for parking;

at least one rear wheel coupled to said frame;

drive means coupled to said rear wheel; and support means mounted to said frame, said support means and said rear wheel defining a polygon lying in a plane generally perpendicular to a plane joining said front wheel means and said at least one rear wheel so that said vehicle may be stood upright on said rear wheel and said support means to reduce a parking area of said vehicle.

10. The vehicle according to claim 9, wherein said support means includes castors.

11. The vehicle according to claim 9, wherein said drive means further includes:

a manual lever pivotally coupled to said frame for reciprocation; and linkage means joining said lever and said rear wheel for rotating said rear wheel upon reciprocation of said lever.

12. The vehicle according to claim 11, wherein said linkage means includes:

a flexible linear drive element having a first end attached to said lever;

tensioning means attached to a second end of said drive element to maintain tension in said drive element; and a free-wheel hub coupled to said rear wheel, said drive element wound about and engaging said hub to turn said hub to propel said vehicle.

* * * * *

UNITED STATES PATENT AND TRADEMARK OFFICE
CERTIFICATE OF CORRECTION

PATENT NO. : 5,284,355
DATED : February 8, 1994
INVENTOR(S) : Shizuo Ishii

It is certified that error appears in the above-indentified patent and that said Letters Patent is hereby corrected as shown below:

In the drawings, Figure 3 should be deleted to appear as shown on the attached page.

Signed and Sealed this

Nineteenth Day of July, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,284,355
DATED : February 8, 1994
INVENTOR(S) : Shizuo Ishii

It is certified that error appears in the above-identified patent and that said Letters Patent is hereby corrected as shown below:

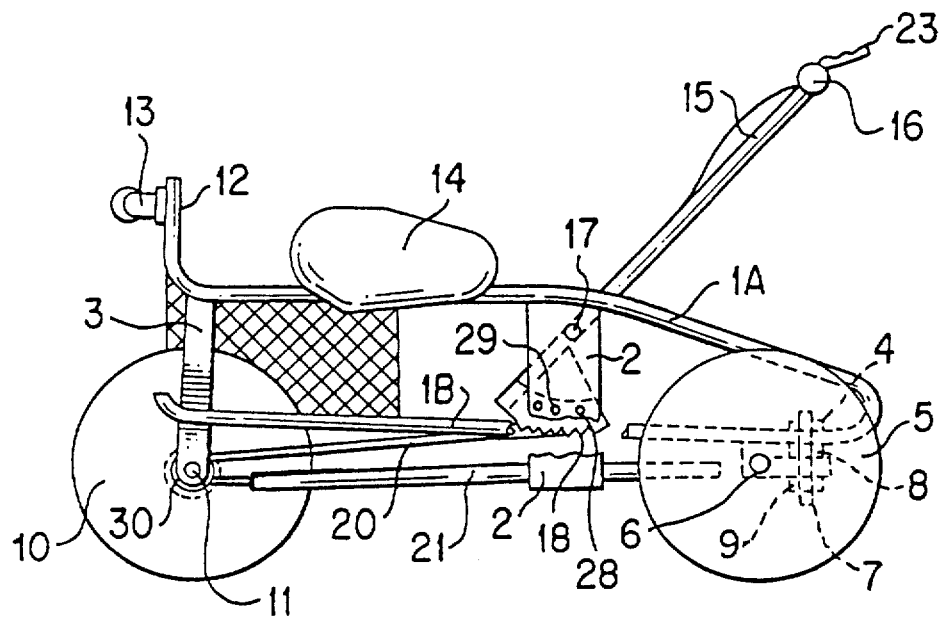

FIG. 3